United States Patent [19]
Odaka et al.

[11] Patent Number: 5,144,353
[45] Date of Patent: Sep. 1, 1992

[54] OPTICAL SYSTEM DRIVING DEVICE OF CAMERA

[75] Inventors: Yukio Odaka; Hideo Ikari, both of Kanagawa, Japan

[73] Assignee: Canon Kabushiki Kaisha, Tokyo, Japan

[21] Appl. No.: 550,013

[22] Filed: Jul. 9, 1990

[30] Foreign Application Priority Data

Jul. 11, 1989 [JP] Japan ................................ 1-178362
Jul. 18, 1989 [JP] Japan ................................ 1-184977

[51] Int. Cl.⁵ ............................................ G03B 13/36
[52] U.S. Cl. .................................................. 354/400
[58] Field of Search ............... 354/400, 402, 195.1, 354/448, 271.1, 403, 404, 405, 234.1

[56] References Cited

U.S. PATENT DOCUMENTS

| 4,504,132 | 3/1985 | Martin et al. ............... 354/195.1 |
| 4,519,691 | 5/1985 | Yamada et al. .............. 354/400 |
| 4,653,892 | 3/1987 | Namai et al. ................ 354/400 |
| 4,684,233 | 8/1987 | Kodaira et al. .............. 354/400 |

Primary Examiner—W. B. Perkey
Attorney, Agent, or Firm—Fitzpatrick, Cella, Harper & Scinto

[57] ABSTRACT

An optical system driving device for a camera includes a displacement mechanism for actuating a photo-taking optical system by displacement; a driving mechanism arranged to alternately take first and second states, to shift the displacement mechanism to a first given degree in a given direction when the first state changes to the second state and to shift the displacement mechanism to a second given degree which is less than the first given degree when the second state a changes to the first state; first stopping mechanism for stopping the driving means in the first state; a second stopping mechanism for stopping the driving means in the second state and photographing means for performing photography under a condition that the driving means is stopped by the first and second stopping means.

46 Claims, 9 Drawing Sheets

FIG.1
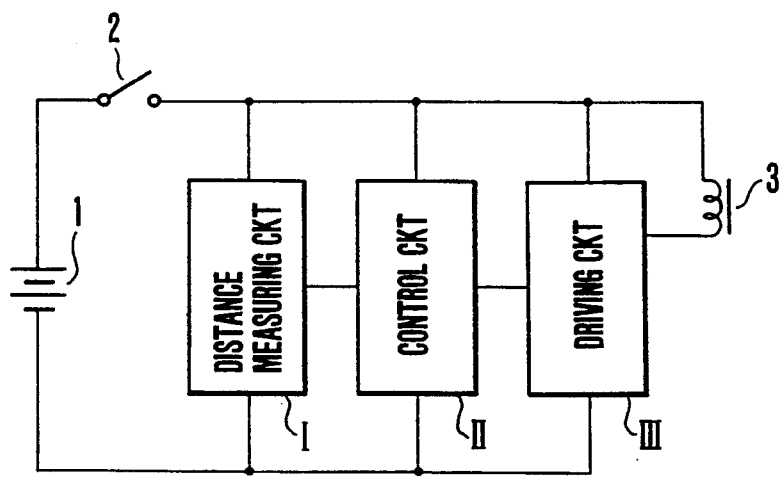
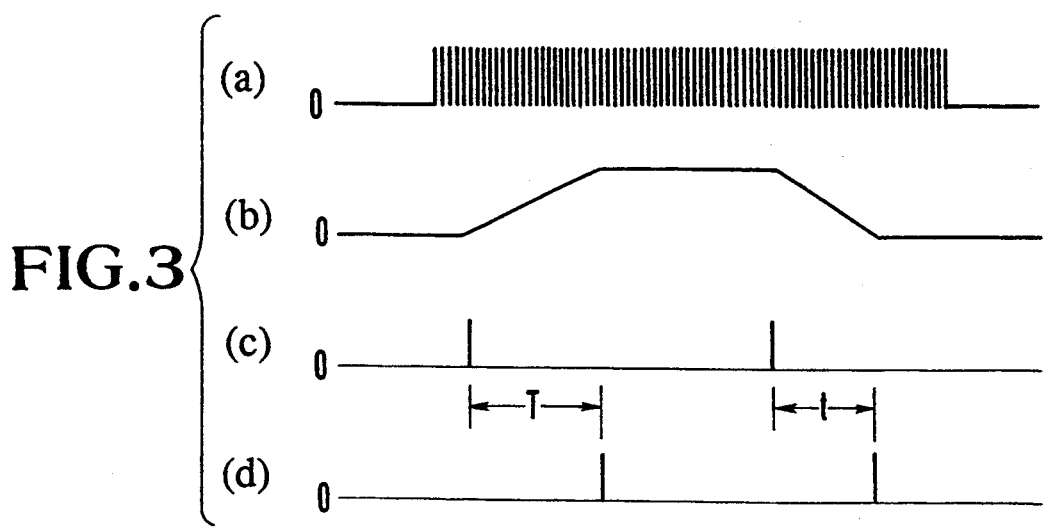
FIG.3

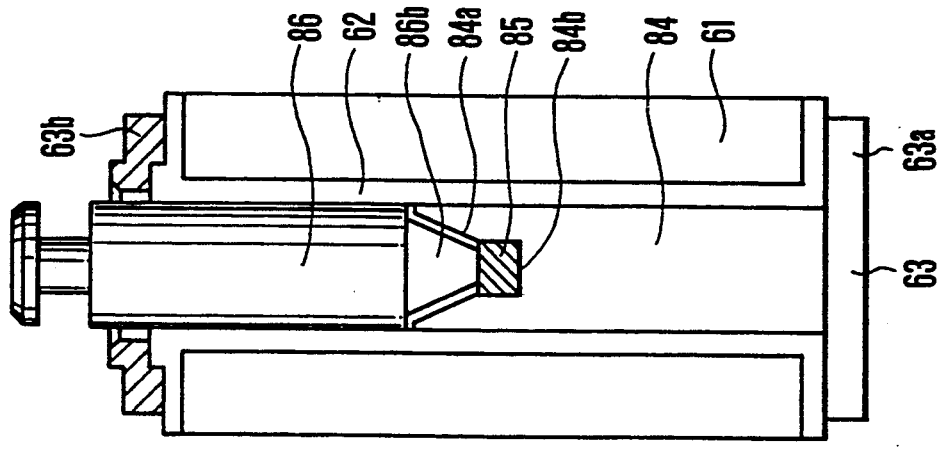
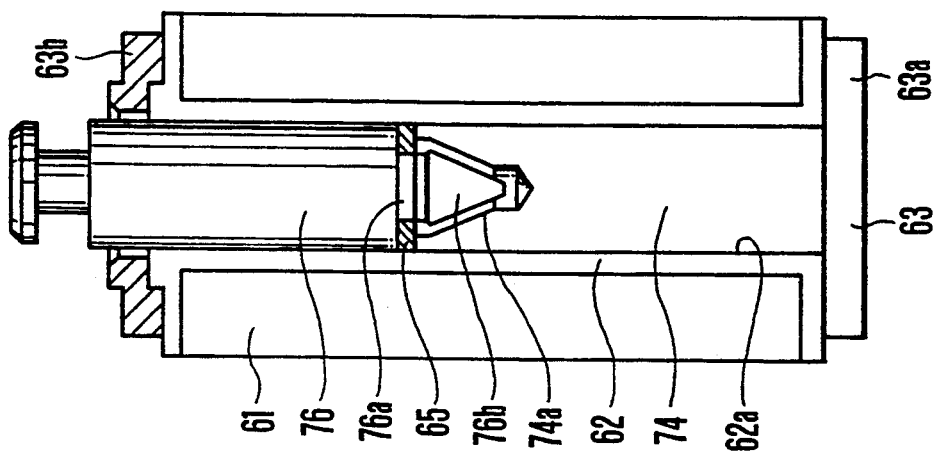

ns. However, the reciprocating motion of the magnet involves the build-up time of the current supply, the delay of a mechanical action, etc.. Therefore, there is a limit to a possible reduction in time required for the reciprocating motion of the magnet.

OPTICAL SYSTEM DRIVING DEVICE OF CAMERA

BACKGROUND OF THE INVENTION

1. Field of the Invention

This invention relates to a camera and more particularly to an optical system driving device which is arranged to drive stepwise the photo-taking optical system of a camera.

2. Description of the Related Art

The conventional lens shifting mechanisms of the kind that draw out the lens of the camera stepwise by a reciprocating motion of a magnet have been arranged in varied types, including: a type which causes a moving coil to make a reciprocal motion by arranging the coil within a magnetic field obtained by a permanent magnet; and another type which causes the reciprocal motion of a moving yoke by means of a plunger type magnet.

The lens shifting mechanism of the kind using a magnet comprises a unidirectional feed mechanism which is driven by the magnet; a cam ring which has a cam face for drawing out the lens and driving teeth arranged to engage the feed pawl of the unidirectional feed mechanism and which is allowed to rotate only in one direction by a lock pawl arranged to engage the driving teeth; urging means which is arranged to urge rearward a lens carrying member carrying the photo-taking lens which is straightly shiftable in the direction of the optical axis thereof; and a screw which is provided on the lens carrying member and which is caused by the urging force of the urging means to be constantly abutting on the cam face of the cam ring. The cam ring is rotated to the degree of one tooth at a time by the feed pawl of the unidirectional feed mechanism in the cycle of "current supply to magnet"-"reverse current supply"-"stopping current supply" or "current supply"-"stopping current supply". The position of the lens is drawn out by the change in the height of the cam face of the cam ring which takes place in the optical axis direction accordingly as the cam ring is rotated. After the cam ring is thus caused to rotate to a degree corresponding to several teeth thereof, a photographing operation is performed by opening and closing a shutter while the cam ring is locked by its lock pawl with no current supplied to the magnet. In other words, each notch or graduation of lens shifting position corresponds to one of the teeth of the cam ring. Therefore, some length of time has been necessary for the cycle of current supply in drawing out the lens by one notch.

Compact cameras which are popular these days are using bifocal lenses or zoom lenses. Therefore, compared with the lenses of the past, lenses of long focal lengths are now in use. Compared with a lens having a short focal length, the lens of a long focal length has a narrower photographing (object) distance range within which the lens is focusable by shifting its position to another position. Therefore, for a given photographing distance range, the lens of a long focal length must be provided with a greater number of lens shifting notches or graduations than the lens of a short focal length.

Then, in order to shift the lens to a given position, the current supply cycle for the magnet must be repeated a number of times which is the same as the number of lens shifting graduations. Therefore, for the lens of a long focal length, the number of current supply cycles increases as much as the increase in the number of graduations. However, the reciprocating motion of the magnet involves the build-up time of the current supply, the delay of a mechanical action, etc.. Therefore, there is a limit to a possible reduction in time required for the reciprocating motion of the magnet.

Further, in turning the cam ring as much as one tooth, the tooth is moved by the feed pawl and is brought to a stop by means of the lock pawl. In actuality, however, in order to accurately stop the cam ring at every tooth, the cam ring must be shifted by the feed pawl to a certain degree beyond a one-tooth distance and then must be shifted back before it is brought to a stop by means of the lock pawl because of the dimensional precision of parts of the feed mechanism. Therefore, in shifting the cam ring to the degree of one tooth, a longer time is required than merely turning it by one tooth. The length of time required for shifting the lens further increases accordingly as the number of lens shifting graduations increases. Therefore, with the number of graduations increased by the increase in focal length, a shutter time lag which is required before a shutter actually opens after a shutter button is pushed also becomes longer.

Further, in respect of reduction in size of the camera, the size of the cam ring cannot be increased. It is, therefore, desirable to increase the number of the teeth by reducing the size of each tooth. However, there is a limit to the reduction in size of the teeth while ensuring reliable engagement of the feed claw and the lock claw. Hence, the possible number of teeth that can be formed on a cam ring of a given size is limited.

Therefore, it is difficult to increase the number of lens shifting graduations beyond a certain number.

SUMMARY OF THE INVENTION

The present invention is directed to the solution of the above-stated problem. It is therefore an object of the invention to provide the optical system driving device for a camera which is arranged to permit an increase in the range of the optical system driving positions, despite the limited number of teeth of its cam ring, without increasing the optical system driving time.

To attain this object, an optical system driving device of a camera arranged according to this invention comprises: displacement means for actuating a phototaking optical system by displacement; driving means arranged to alternately take a first state and a second state, to shift the displacement means to a first given degree in a predetermined direction when the first state changes to the second state and to shift the displacement means in a direction reverse to the predetermined direction to a second given degree which is smaller to the first given degree when the second state changes to the first state; first stopping means for bringing the driving means to a stop in the first state; and second stopping means for bringing the driving means to a stop in the second state.

The above and other objects and features of the invention will become apparent from the following detailed description of embodiments thereof taken in connection with the accompanying drawings.

BRIEF DESCRIPTION OF THE DRAWINGS

FIG. 1 is a block diagram showing the arrangement of a lens shifting mechanism of a camera arranged as an embodiment of this invention. FIG. 3 is a timing chart showing the operation of a double integrating type distance measuring circuit.

FIG. 12 is a sectional view showing another plunger type magnet arranged as a further embodiment of the invention. FIG. 13 is a sectional view showing also a plunger type magnet arranged as a still further embodiment.

DETAILED DESCRIPTION OF THE PREFERRED EMBODIMENTS

Figure 8:
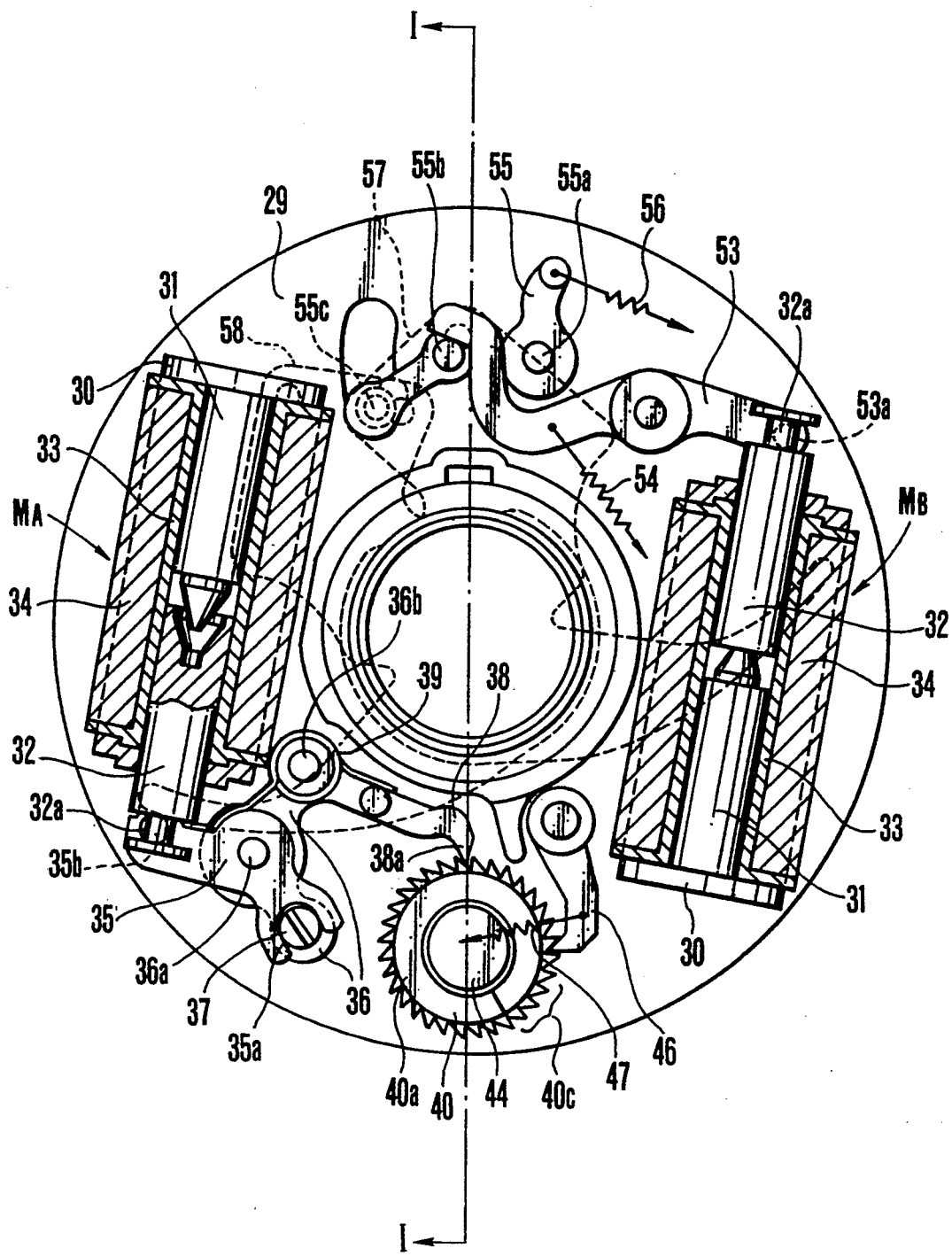
FIG. 8 is a plan view showing the lens shifting mechanism as in a state of having no current supply to a magnet.
Figure 10:
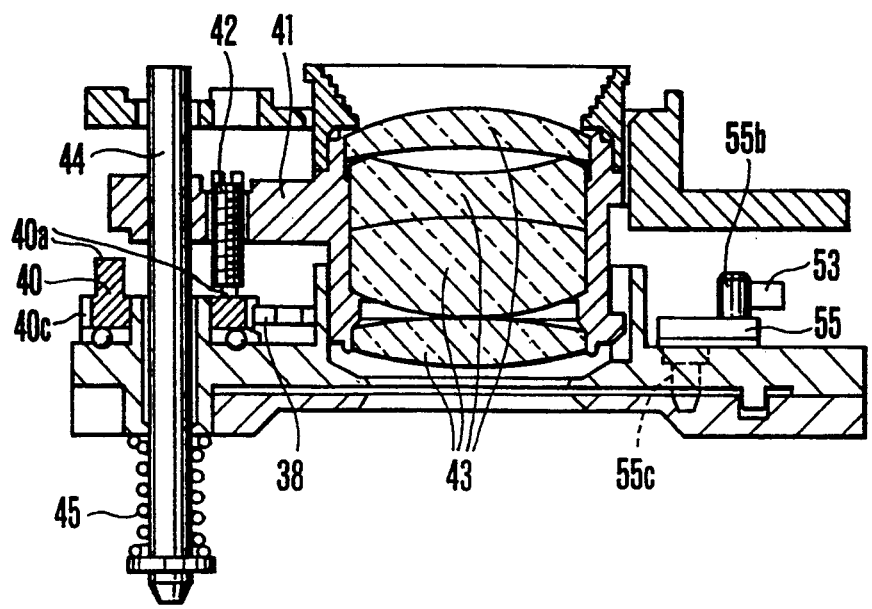
FIG. 10 is a sectional view showing the lens shifting mechanism.

An embodiment of this invention is described below with reference to the accompanying drawings:

FIG. 8 is a plan view showing a lens shifting mechanism which is arranged according to this invention as an embodiment thereof. FIG. 10 is a sectional view taken along the line I—I of FIG. 8. FIGS. 8 and 10 also show a shutter operating mechanism. In FIG. 8, parts related to the lens shifting mechanism are shown approximately in the lower left half part of the illustration. Parts related to the shutter operating mechanism are shown in the upper right half part of the illustration.

Referring to these figures, a base plate 29 is arranged to have the parts of the lens shifting mechanism and those of the shutter operating mechanism mounted thereon. A plunger type magnet MA is arranged to perform a driving and controlling action for lens shifting. A plunger type magnet MB which is of the same arrangement as the magnet MA is arranged to open and close shutter blades in the above-stated shutter operating mechanism.

Each of the magnets MA and MB comprises: a holder 30 which is made of a magnetic material such as iron, permalloy or the like and is arranged to form the frame of the plunger type magnet and to form a magnetic path of the magnet; a cylindrical bobbin 33 which is carried by the holder 30 and has a coil 34 wound around the outer circumferential side thereof; a cylindrical fixed yoke 31 which is made of a magnetic material and is secured to the holder 30; and a moving yoke 32 which is made of a magnetic material and inserted into the circular hole of the bobbin 33 via a guide hole (not shown) of the holder 30 in such a way as to be capable of making a reciprocating motion within the bobbin 33. When a current is supplied to the coil 34, the coil 34 is magnetized to guide the moving yoke 32 to the guide hole of the holder 30. The yoke 32 is then pulled toward the fixed yoke 31 through the inner hole of the bobbin 33 and thus comes into tight contact with the fixed yoke 31.

As shown in FIG. 10, the lens shifting (drawing-out) mechanism is arranged on the side of the camera body in such a way as to be capable of shifting in the direction of an optical axis a photo-taking lens barrel 41 which carries a photo-taking lens 43. The lens barrel 41 is secured to a guide bar 44 which is urged to move rearward in the optical axis direction (downward as viewed in FIG. 10) by a spring 45. A screw 42 is screwed to the lens barrel 41 to extend rearward in the optical axis direction. The extending end of the screw 42 abuts on a cam face 40a of an annular cam ring 40 which is rotatably mounted on the guide bar 44. The cam face 40a is formed on the front side of the cam ring 40 and is arranged to vary its height in the optical axis direction. With the extending end of the screw 42 allowed to abut on the cam face 40a, the lens barrel 41 is movable forward in the optical axis direction against the force of the spring 45 by unidirectionally rotating the cam ring 40. There is a difference in height between the starting end and the ending end of one rotation of the cam face 40a of the cam ring 40. This brings the lens barrel 41 back to its original position when the cam ring 40 makes one rotation.

A plurality of teeth 40c are formed and evenly spaced along the whole outer circumference of the cam ring 40. A lock pawl 46 which is urged clockwise by a spring 47 engages the teeth 40c to prevent the cam ring 40 from rotating counterclockwise. When the cam ring 40 rotates clockwise, the lock pawl 46 engages the teeth 40c one by one. The lens barrel 41 is thus arranged to be drawn out (shifted forward) by the clockwise rotation of the cam ring 40. A cam ring driving mechanism which is provided for rotating the cam ring 40 to draw out the lens barrel 41 is formed jointly by the magnet MA, a rotary lever 35, a driving lever 36 and a feed pawl 38.

The rotary lever 35 and the driving lever 36 are mounted on the base plate 29 in such a way as to be rotatable on a fulcrum shaft 36a which is erected on the base plate 29. A U-shaped groove 35a is formed in one end of the rotary lever 35 which is disposed above the driving lever 36. The head part of an eccentric pin 37 which is rotatably mounted on one end part of the driving lever 36 is fitted into the U-shaped groove 35a. Thus, rotary lever 35 and the driving lever 36 are arranged to be rotated in one body through the eccentric pin 37. The positions of these levers on the shaft 36a are variable relative to each other by rotating the eccentric pin 37.

A dowel 35b is erected on the other end of the rotary lever 35. The dowel 35b engages a circumferential groove 32a formed in the fore end part of the moving yoke 32 of the magnet MA. On the other end part of the driving lever 36 is erected a fulcrum shaft 36b. The feed pawl 38 is rotatably carried by this shaft 36b. A claw part 38a is formed at the fore end part of the feed pawl 38 and is arranged to engage the teeth 40c of the cam ring 40. A coiled spring 39 is fitted on the support shaft 36b which is erected on the other end of the driving lever 36. One end of the spring 39 is attached to the rotary lever 35 in such a way as to exert a counterclockwise rotating force on the rotary lever 35. Meanwhile, the other end of the spring 39 is attached to the feed pawl 38 in such a way as to exert a clockwise rotating force on the pawl 38. The moving yoke 32 of the magnet MA is urged to part from the fixed yoke 31 by the resilient force of the spring 39 through the rotary lever 35. Further, the counterclockwise rotation of the driving lever 36 from its position as shown in FIG. 8 is prevented by a stopper which is not shown but is provided on the base plate 29. Therefore, the rotary lever 35 is also prevented from rotating counterclockwise from its position as shown in FIG. 8. However, the rotating angle of the rotary lever 35 on the fulcrum shaft 36a is adjustable by turning the eccentric pin 37, so that the shifting degree of the feed pawl 38 can be adjusted relative to the shifting stroke of the moving yoke 32.

Figure 9:
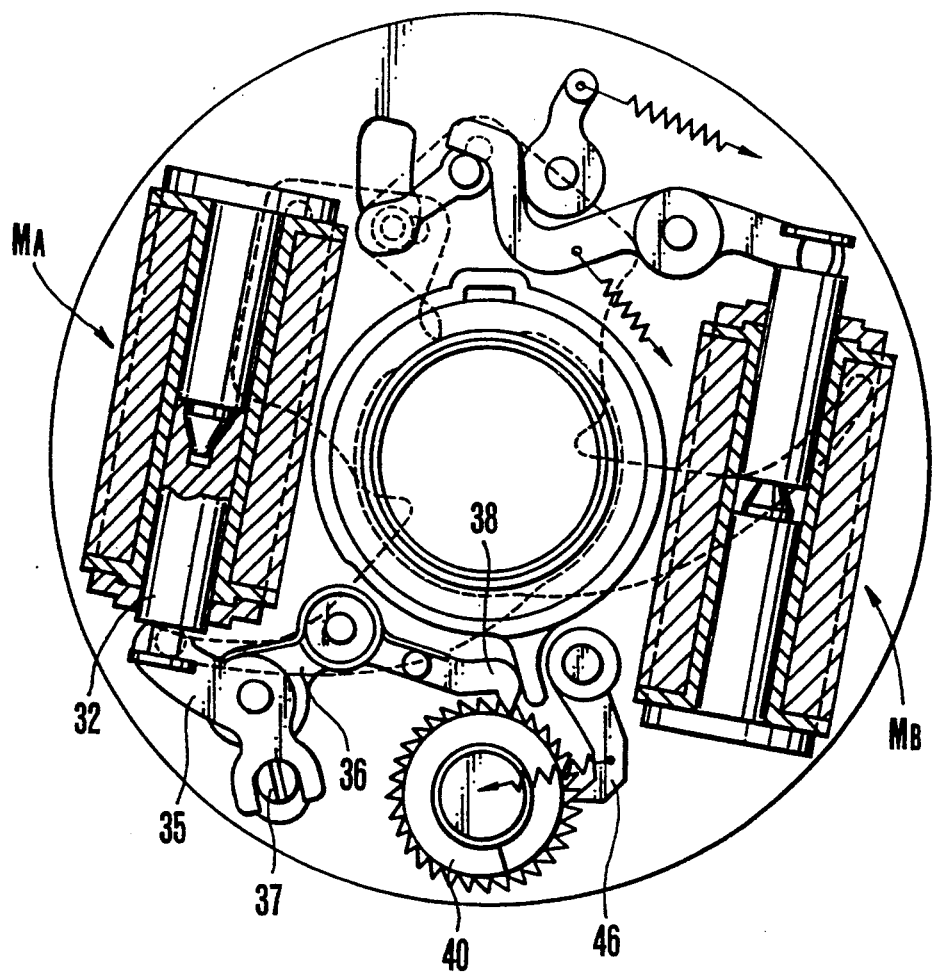
FIG. 9 is a plan view showing the lens shifting mechanism as in a state of having a current supplied to the magnet.

When the coil 34 of the magnet MA of FIG. 8 has no current supply, the driving lever 36 and the feed pawl 38 are interconnected in an "L" shape. The lock pawl 46 fully engages the teeth 40c of the cam ring 40 under this condition. When a current is supplied to the coil 34 of the magnet MA, the moving yoke 32 moves toward the fixed yoke 31. The driving lever 36 then turns clockwise on the fulcrum shaft 36a together with the rotary lever 35. This causes the feed pawl 38 to push the teeth 40c of the cam ring 40 to the right as viewed in FIG. 8. The cam ring 40 is thus caused to rotate clockwise. The lock pawl 46 then first comes to engage a next tooth 40c against the urging force of the spring 47 accordingly as the cam ring 40 rotates. When the lock pawl 46 is caused to come to an intermediate point between this tooth and another tooth by the further rotation of the cam ring 40, the moving yoke 32 of the magnet MA comes to a stop, being pulled into contact with the fixed yoke 31. The moving stroke of the moving yoke 32 is adjusted by the eccentric pin 37 to ensure this state, as shown in FIG. 9.

When the current supply to the coil 34 of the magnet MA is cut off, the moving yoke 32 is pulled back in the direction of parting from the fixed yoke by the force of the spring 39. At the same time, the feed pawl 38 also comes back to its original position. At this time, the cam ring 40 is released from the clockwise moving action of the feed pawl 38. Therefore, the force of a spring 45 which is urging the lens barrel 41 rearward in the optical axis direction causes the cam ring 40 to rotate counterclockwise through the screw 42 and the cam face 40a. The cam ring 40 then moves backward to an extent corresponding to a half tooth in the counterclockwise direction to be locked by the lock pawl 46.

In short, the cam ring 40 is rotated as much as one tooth by the current supply to the coil 34 of the magnet MA from its position obtained before the current supply. As a result, the lens barrel 41 is pushed by the cam face 40a to be drawn out to the extent of one tooth. Further, if the current supply to the coil 34 of the magnet MA is kept on, the lens barrel 41 is drawn out to an extent corresponding to a 1.5 tooth distance.

Next, the shutter operating mechanism is arranged as follows: The dowel 53a of a shutter closing lever 53 is fitted in the circumferential groove 32a of a moving yoke 32 of the magnet MB. A selector lever 55 is arranged to turn around a shaft 55a and is urged clockwise by a spring 56. A blade driving pin 55c is provided on the selector lever 55. The pin 55c is fitted through a hole of the base plate 29 into slots provided in shutter blades 57 and 58. The shutter opens when the selector lever 55 turns clockwise as viewed in the drawing and closes when the lever 55 turns counterclockwise. The selector lever 55 is provided with another dowel 55b which is arranged to abut on the shutter closing lever 53. The closing lever 53 is urged to turn counterclockwise as viewed on the drawing by a spring 54 which is stronger than spring 56. The shutter is kept in a closed state by this urging force on the selector lever 55. When a current is supplied to the coil 34 of the magnet MB, the moving yoke 32 of the magnet MB moves downward as viewed in the drawing. This causes the closing lever 53 to turn clockwise as viewed in the drawing to allow the clockwise turn of the selector lever 55. As a result, the shutter opens.

FIG. 1 shows in a block diagram the arrangement for controlling the current supply to the magnet MA of the lens shifting mechanism. The block diagram includes a battery 1; a power supply switch 2; the coil 3 (corresponds to the coil 34 of FIG. 8) of the magnet of the lens shifting mechanism; a distance measuring circuit I which is arranged to process measured distance data coming from a distance measuring device; a control circuit II; and a driving circuit III which is arranged to supply a current to the coil 3. When the power supply switch 2 is closed in this arrangement, a power supply is effected from the battery 1 to each of the circuits. The distance measuring circuit I supplies the control circuit II with a signal which corresponds to a measured distance. The control circuit II generates a pulse signal corresponding to this signal and supplies it to the driving circuit III. The control circuit II further performs driving control over the distance measuring circuit I and also driving control over the above-stated distance measuring device according to a signal received from a release switch which is not shown. The control circuit II is composed of a microcomputer. In response to the above-stated pulse signal, the driving circuit III supplies a current to the magnet 3 and makes a focus adjustment by shifting the lens barrel stepwise. After that, a photographing operation is performed by operating the shutter with a shutter control circuit which is not shown. The lens barrel is further caused to move stepwise after the shutter is closed. The current supply to the magnet is cut off when the lens barrel is brought back to its original position. Further details of this operation will be described later herein.

Figure 4:
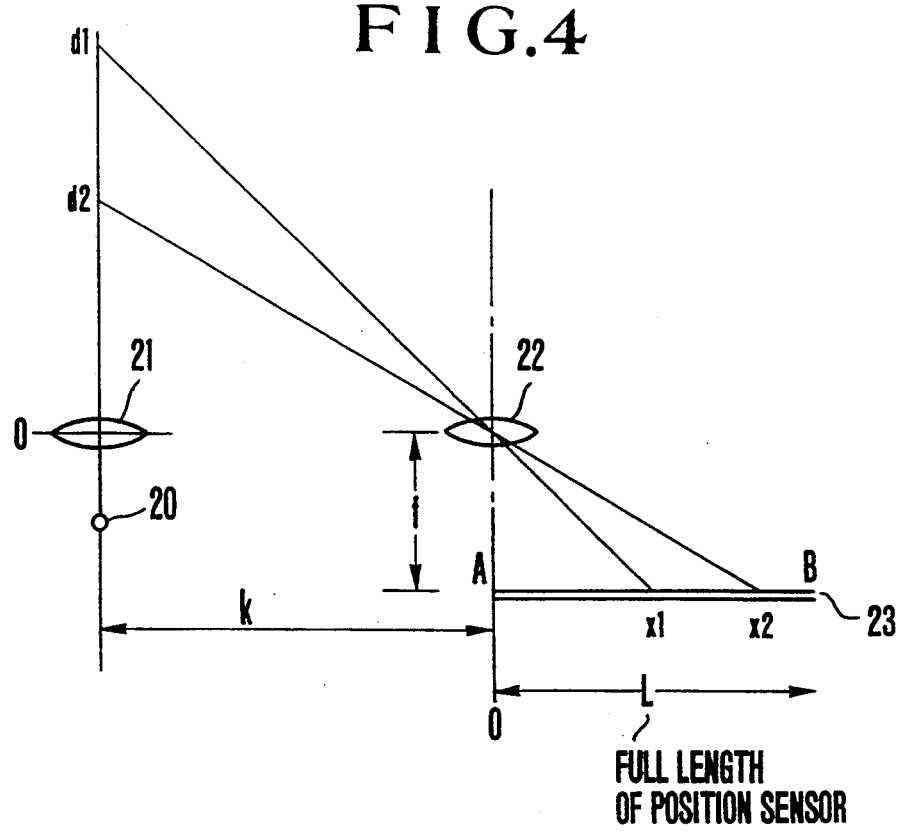
FIG. 4 shows the principle of trigonometrical measurement.

FIG. 4 shows the operation of a distance measuring device of a so-called active type which is based on the principle of trigonometrical measurement and to which this invention advantageously applies. Referring to FIG. 4, the illustration includes the light emitting part 20 which is an infrared ray emitting diode; a light projecting lens 21 which is arranged to convert the light emission output of the light emitting part 20 into a beam; and a light receiving lens 22. The light receiving lens 22 is arranged to condense a reflection light coming from an object into a spot-light state on the surface of a PSD (position sensitive device) 23.

With the distance measuring device arranged in this manner, the beam of light projected on an object d1 is condensed through the light receiving lens 22 on the surface of the PSD 23 in a position x1. This position x1 can be expressed as follows:

$$x1 = \frac{k \cdot f}{d1} \quad (1)$$

wherein, "k" represents a base-line length and "f" is the focal length of the light receiving lens.

Assuming that the length of the PSD 23 is L, currents IA and IB which result from the light received and obtained from the output terminals A and B of the PSD 23 can be expressed as follows:

$$IA = \frac{(1 - x1)}{L} \cdot IO \quad (2)$$

-continued $$IB = \frac{x1}{L} \cdot IO \quad (3)$$

wherein, IO=IA+IB

Therefore, Formulas (1) and (3) are reducible to give an object distance d1 as expressed below:

$$d1 = \frac{kf}{L} \cdot \frac{IO}{IB} \quad (4)$$

The distance measuring circuit I is of the known double integrating type. The circuit I is arranged to integrate currents IB and IO by integrating means and to obtain a distance signal from integrating time. This action is performed in a manner as described below with reference to the timing chart of FIG. 3:

In FIG. 3, part (a) shows a pulse train representing the lighting state of the infrared ray emitting diode of the distance measuring device; part (b) shows an integral voltage waveform obtained when the output of the infrared ray emitting diode is received by the light receiving lens; part (c) shows integration start timing pulses to be applied to the integrator of the distance measuring circuit I from the microcomputer (control circuit II); part (d), shows timing pulses to be supplied to the microcomputer from the distance measuring circuit I.

The object to be photographed is irradiated with beam-like pulse light projected as represented by the pulse train shown at the part (a). The pulse light is reflected by the object and is converted into a current by the light receiving circuit of the distance measuring device which includes the light receiving lens, the PSD, and so forth The current thus obtained is integrated in synchronism with the lighting timing of the pulse light.

When an integration start signal is first supplied from the microcomputer, the current IB of the PSD begins to be integrated by the integrator. When the integrating time reaches a given time T, the integrating process is brought to a stop. In this instance, the amount of electric charge Q of the integrator obtained after the lapse of the given time T can be expressed as follows:

$$Q = IB \cdot T \quad (5)$$

After the integration of the current IB, the current IO is integrated. The integrated electric charge of the integrator obtained after the lapse of time t can be expressed as:

$$Q = IO \cdot t \quad (6),$$

From Formulas (5) and (6), the following relation is obtained:

$$\frac{IB}{IO} = \frac{t}{T} \quad (7)$$

In FIG. 3, the part (b) shows the waveform of the output of the integrator. As shown, the current IB is integrated upward. Upon expiration of the given period of time T, a period of time t is obtained by integrating the current IO downward. By this, operation a distance signal is obtained in accordance with Formulas (7) and (4). Further, the periods of time t and T are given in the form of digital data to the microcomputer through a counter.

While the embodiment is described above as using the distance measuring circuit of the known double integrating type, the distance measuring circuit usable in accordance with this invention is not limited to this type.

The control circuit II is arranged to obtain the lens shifting degree N on the basis of the distance signal from the distance measuring circuit I. This lens shifting degree N corresponds to a distance zone for an allowable degree of blur. It also corresponds to a number of times for which the current supply is effected to the coil 3 (or the coil 34 of the magnet MA as shown in FIG. 8). Assuming that the number of teeth 40c of the cam ring 40 of the lens shifting mechanism of FIG. 8 is n, this lens shifting degree N is set at a value from 0 to 2n (an integer). One cycle of the driving action on the magnet MA is arranged to be as follows: The cam ring 40 is rotated to the degree of 1.5 tooth width when the moving yoke 32 is caused to be attracted by the fixed yoke 31 with the current supply effected to the coil 34. Then, the current supply to the coil 34 is cut off to allow the cam ring 40 to move back to the degree of 0.5 tooth width as a result of a spring force exerted to bring the moving yoke 32 to its initial position. The cam ring 40 is eventually rotated to the degree of one tooth-width. The lens barrel 41 is thus moved forward to an extent which also corresponds to one tooth.

In this case, the lens shifting degree N is set at a value which is two times as much as the number of teeth 40c of the cam ring 40, because: The cam ring 40 is arranged to be stopable at any half-tooth position, such as positions of one tooth, 1.5 teeth, 2 teeth, 2.5 teeth, etc. Therefore, in the case of this specific embodiment, the current supply to the magnet MA is controlled differently according to whether the value of the lens shifting degree N is an even number or an odd number.

In a case where the degree N is an even number, the current supply is controlled in the cycle (N/2+1) times.

If the degree N is an odd number, the current supply is controlled in the cycle ((N−1)/2+1) times.

At the last round of the cycle, the current supply to the coil is arranged to be held on without cutting if off. In the case of this embodiment, a current supply holding signal is output from the control circuit II to the driving circuit III for the purpose of holding the current supply at the last round of cycle.

Table 1 below shows the presence or absence of the current supply holding signal along with the current supply cycles relative to the measured distance data:

TABLE 1

| Measured distance data N | Current supply cycle | Presence or absence of hold current supply |
|---|---|---|
| 0 | 1 | absent |
| 1 | 1 | present |
| 2 | 2 | absent |
| 3 | 2 | present |
| 4 | 3 | absent |
| 5 | 3 | present |
| 6 | 4 | absent |
| — | — | — |
| — | — | — |
| 2n − 1 | n | present |

TABLE 1-continued

| Measured distance data N | Current supply cycle | Presence or absence of hold current supply |
| --- | --- | --- |
| 2n | n + 1 | absent |

Figure 5:
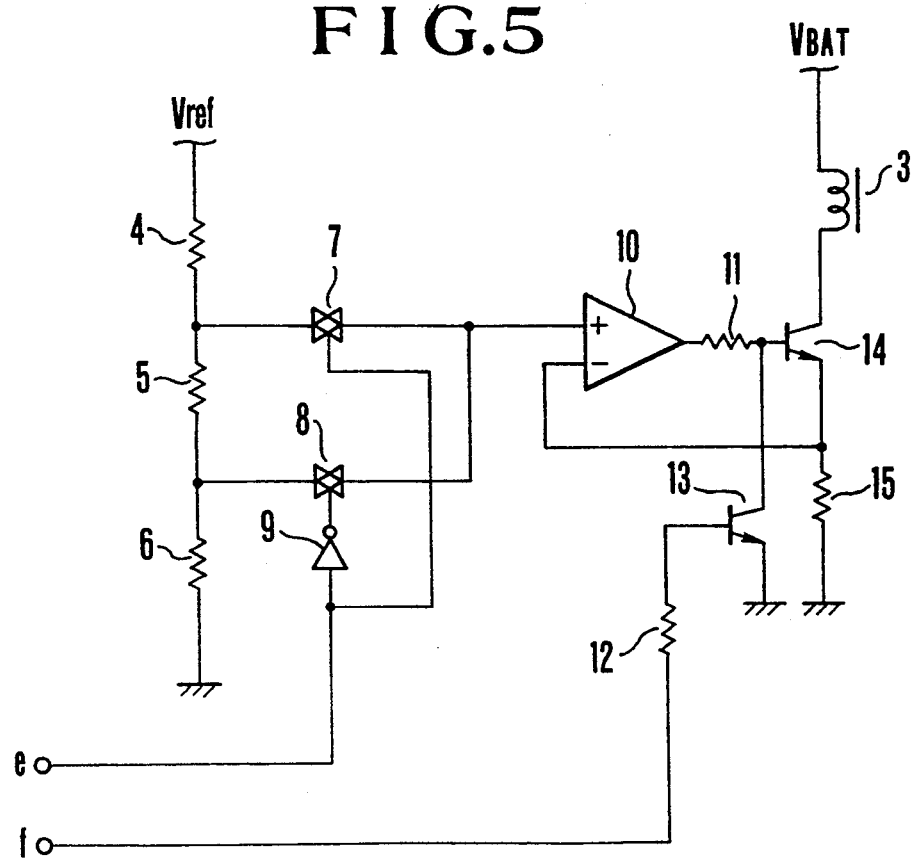
FIG. 5 is a circuit diagram showing the arrangement of a driving circuit included in FIG. 1.

FIG. 5 shows in a circuit diagram the arrangement of the driving circuit III for the magnet MA. The illustration includes a constant voltage source Vref; the coil 34 of the magnet MA; resistors 4, 5 and 6 which are arranged to divide the voltage of the constant voltage source Vref; analog switches 7 and 8 which are controlled through an inverter 9 by a signal line e from the control circuit II to make one of them conductive; a differential amplifier 10; a resistor 11 which is arranged to limit the current of the differential amplifier 10 and is connected to the base of an output transistor 14; a detection resistor 15 which is arranged to detect a current supplied to the coil 34; and a transistor 13 which is arranged to control the base of the output transistor 14. The transistor 13 is controlled through a resistor 12 by a signal line f from the control circuit II. The voltage applied to the non-inverting input terminal of the differential amplifier 10 varies according to the high level or low level of the signal line e. The current supplied to the coil 34 is made constant by this voltage. By this, operation the attracting force of the magnet MA for moving the moving yoke 32 to the fixed yoke 31 is stabilized. Therefore, the current varies according to whether the signal of the signal line e is at a high level or at a low level as expressed below:

$$I_{low} = \frac{1}{R15} \cdot \frac{R6}{R4 + R5 + R6} \cdot V_{ref}$$

$$I_{hi} = \frac{1}{R15} \cdot \frac{R5 + R6}{R4 + R5 + R6} \cdot V_{ref}$$

As apparent from the above formulas, the current Ihi obtained when the signal line e is at a high level is larger than the current Ilow obtained when the line e is at a low level. In allowing the moving yoke 32 to be moved from its initial position to the fixed yoke 31 by the attracting force of the magnet MA, the control circuit II produces the signal of the signal line e at a high level to have the current Ihi (hereinafter referred to as a pull current) supplied to the coil 34. Further, in holding the moving yoke 32 in a state of being stuck to the fixed yoke 31, the level of the signal line e is changed over to a low level to have the current Ilow (hereinafter referred to as a hold current) supplied to the coil 34.

This embodiment is arranged to switch the pull current over to the hold current for the following reason: The moving yoke 32 of the magnet MA may be pulled from its initial position to the fixed yoke 31 by setting the current only at the pull current value and, in holding the moving yoke 32 in the state of being stuck to the fixed yoke 31, the same current may be allowed to flow. However, a current value required for holding the moving yoke 32 in the state of being pulled to the fixed yoke 31 is only one-fifth or sixth or one thereabout of the current value required in pulling the moving yoke 32 from its initial position to the fixed yoke 31. The switchover of the current, therefore, prevents unnecessary electric energy consumption and also prevents electrical parts from being unnecessarily heated when they are driven.

Figure 2:
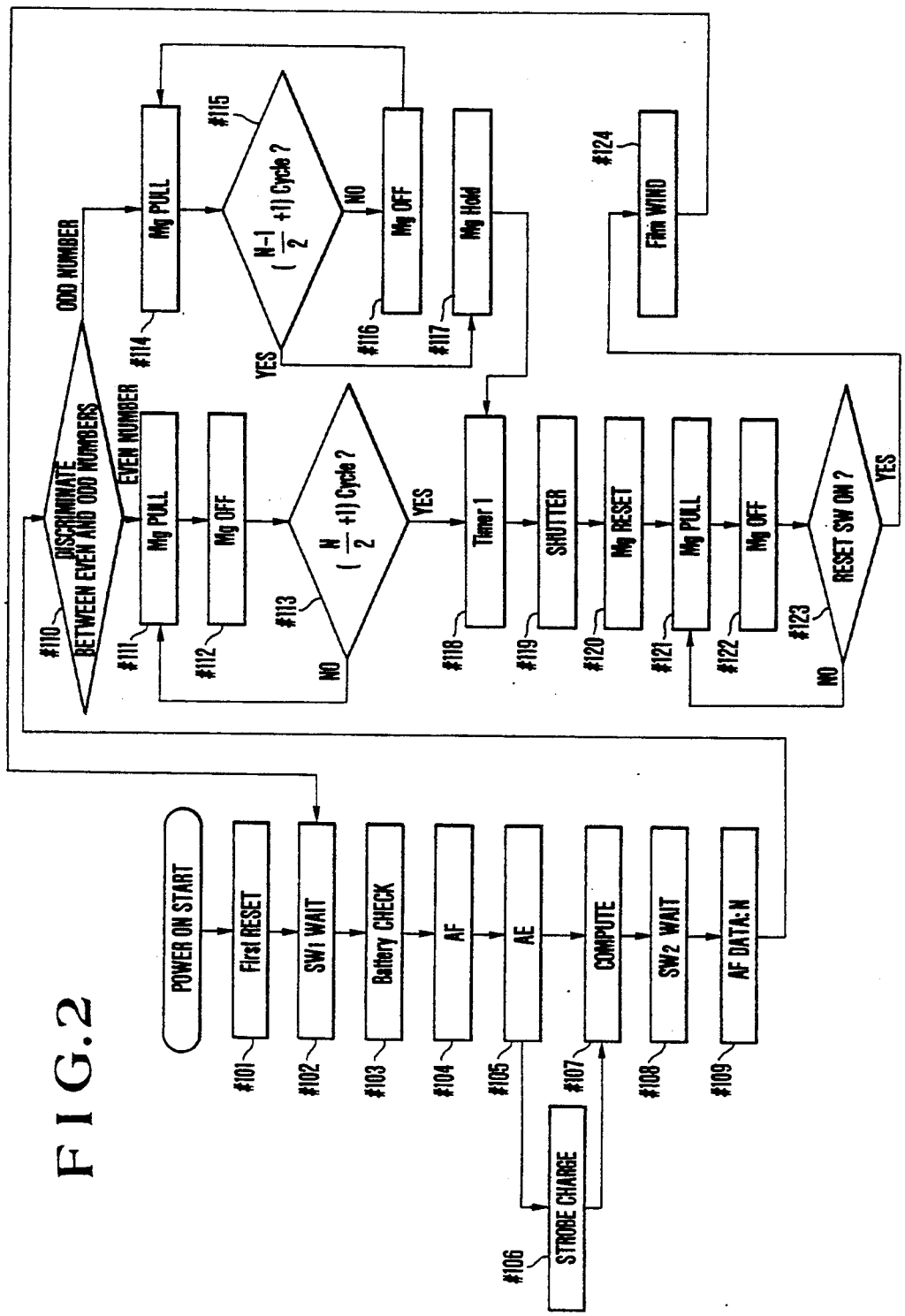
FIG. 2 is a flow chart showing the lens shifting action of a control circuit included in FIG. 1.

Next, the lens shifting operation, etc. performed by the microcomputer of the control circuit II is described below with reference to the flow chart of FIG. 2:

When the power supply switch 2 is closed, the power is supplied to each block of the circuit arrangement shown in FIG. 1. The microcomputer which is included in the control circuit II is rendered operative to execute the program of steps #101 to #124. At the step #101: Data is reset. At the step #102: The flow of the program waits for a pushing operation on the shutter button (SW1) of the camera. When the shutter button is pushed, the flow comes to the step #103. At the step #103: A check is made for the battery. If the battery permits a photographing operation, the flow comes to the step #104 to actuate the distance measuring circuit I and the distance measuring device.

At the step #105: After the measured distance data is obtained, a light measuring action is performed. At the step #106: If a measured light value is judged to be too dark, a control action is performed for charging a flash device. At the step #107: After completion of a charging action on the flash device or in a case where the measured light value indicates that the use of the flash device is unnecessary, a computing process is performed on the data of distance and light measured.

With the computing process performed at the step #107, the lens shifting degree N is obtained from the measured distance data. The measured light data is converted into a computed value by adding an information signal on the sensitivity of the film in use, etc. to the measured light data. The data thus obtained is converted into data to be used for shutter control.

At the step #108: After the computing process, the flow waits for a signal indicating a second stroke (SW2) of the pushing operation on the shutter release button. The embodiment is in a state of being ready for shooting. At the step #109: When the release button is pushed under this condition, the lens is driven stepwise toward the focus zone. At the step #110: A check is made to find if the value of the measured distance data N is an even number or an odd number. If the measured distance data N is an even number, the flow comes to the step #111. At the steps #111, #112 and #113: A current is supplied to the coil 34 for a period of time required for pulling the moving yoke 32 completely into contact with the fixed yoke 31. After that, the current supply is cut off for a given period of time until the moving yoke 32 comes back to its initial position. The current-supply effecting and stopping actions are performed in one cycle. The cam ring 40 is rotated for a predetermined number of teeth by controlling the current supply in the cycle of (N/2+1), so that the lens barrel 41 is driven stepwise.

Figure 6:
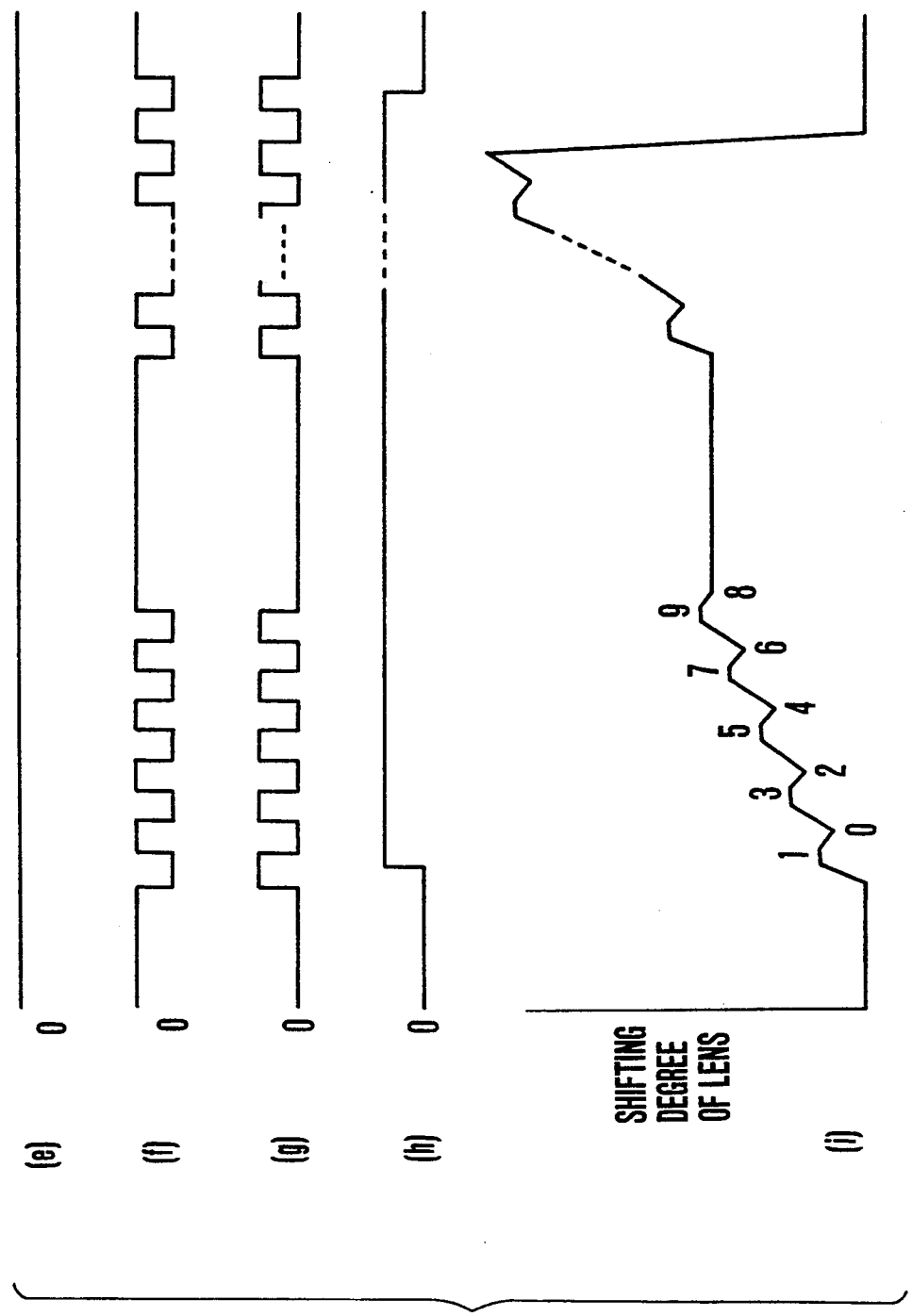
FIG. 6 shows the timing of an output signal supplied from the control circuit to the driving circuit when measured distance data N is an even number together with a lens shifting degree.

When the measured distance data N is an even number, the driving circuit III operates and the lens barrel 41 is shifted as follows: Referring to FIG. 6 which is a timing chart, parts (e) and (f) respectively show the control voltages of the signal lines e and f of FIG. 5. A part (g) shows the current supplied to the magnet MA. A part (h) shows a signal output from an initial position detection switch which is arranged to detect the initial position of the lens barrel. The detection switch is in an on-state when this signal is at a low level. A part (i) shows the lens shifting degree.

In the case of FIG. 6, the measured distance data N is 8 and the signal line e remains at a high level. Therefore, a pull current which is at a high current value is selected. When the level of the signal line f becomes low under this condition, the transistor 13 of the driving circuit shown in FIG. 5 becomes nonconductive. This allows the pull current to be applied to the coil 34 of the magnet MA. Further, when the level of the signal line f becomes high, the transistor 13 becomes conductive to cut off the pull current. When the current is supplied to the coil 34, the moving yoke 32 moves upward, as viewed in the drawing, to come into tight contact with the fixed yoke 31. Then, in association with the movement of the moving yoke 32, the rotary lever 35 and the driving lever 36 turn clockwise to cause the feed pawl 38 to move to the right as viewed in the drawing. The fore end of the feed pawl 38 pushes one of the teeth 40c of the cam ring 40 to rotate the cam ring 40 clockwise. As a result of this rotating motion, the lock pawl 46 sways once to enter a next tooth space against the force of the spring 47. When the further rotation of the cam ring 40 brings the lock pawl 46 to an intermediate point between the current tooth and a next tooth, as shown in FIG. 9, the moving yoke 32 comes to a stop in close contact with the fixed yoke 31. Then, the current supply is cut off to allow the moving yoke 32 to be moved back to a lower position by the force of the spring 39. At the same time, the feed pawl 38 also comes back moving to the left as viewed in the drawing. At this time, the cam ring 40 rotates backward or counterclockwise to a degree corresponding to one-half tooth width before it comes to a stop being locked by the lock pawl 46. Therefore, during a period between time points before and after the current supply to the coil 34, the cam ring 40 rotates clockwise as much as one tooth thereof. The cam face 40b then pushes the lens barrel 41 to move it forward also to an extent of one tooth.

With these processes performed in one cycle, the lens is shifted stepwise in (N/2+1) cycles, that is, five cycles in this case. Therefore, the lens comes to a stop at a point as indicated by a numeral 8 at the part (i) in FIG. 6.

At the step #118: A photographing action is performed after the lapse of a given period of time defined by means of a timer for the purpose of absorbing any vibrations that result from the stepwise movement of the lens.

At the step #119: For photographing, a current is supplied to the coil 34 of the magnet MB. This causes the moving yoke 32 of the magnet MB to be pulled downward as viewed in the drawing and thus comes into tight contact with a fixed yoke 49. In association with the movement of the moving yoke 32, a closing lever 53 turns clock-wise as viewed in the drawing. A selector lever 55 is caused by a spring 56 to turn clockwise to open shutter blades 57 and 58. After that, the current supply to the coil 34 of the magnet MB is cut off according to a computed value obtained at the step #107. Then, a spring 54 causes the closing lever 53 to turn counterclockwise. In association with this, the moving yoke 32 comes back to its upper position as viewed in the drawing. At the same time, the selector lever 55 is pushed by the closing lever 53 to turn counterclockwise. The shutter is closed by this operation.

In cases where the measured distance data N is an even number, the cam ring 40 is in a state of being locked by the lock pawl 46 in one of positions located at intervals of one tooth with no current supplied to the coil 34 of the magnet MA, as described above. The lens is then in one of graduated positions corresponding to the teeth 40c of the cam ring 40.

Steps #114, #115 and #116: In a case where the measured distance data N is an odd number, the current supply to the magnet MA is repetitively effected in the same manner as in the case of the even number value of the data N for a ((N−1)/2) number of times. At the step #117: After that, when the current supply for the ((N−1)/2+1)-th time is effected, a hold signal is supplied to the driving circuit III for the purpose of holding the moving yoke 32 in the state of being stuck to the fixed yoke 31. As a result, a hold current is supplied to the magnet to hold the moving yoke 32 in contact with the fixed yoke 31.

Figure 7:
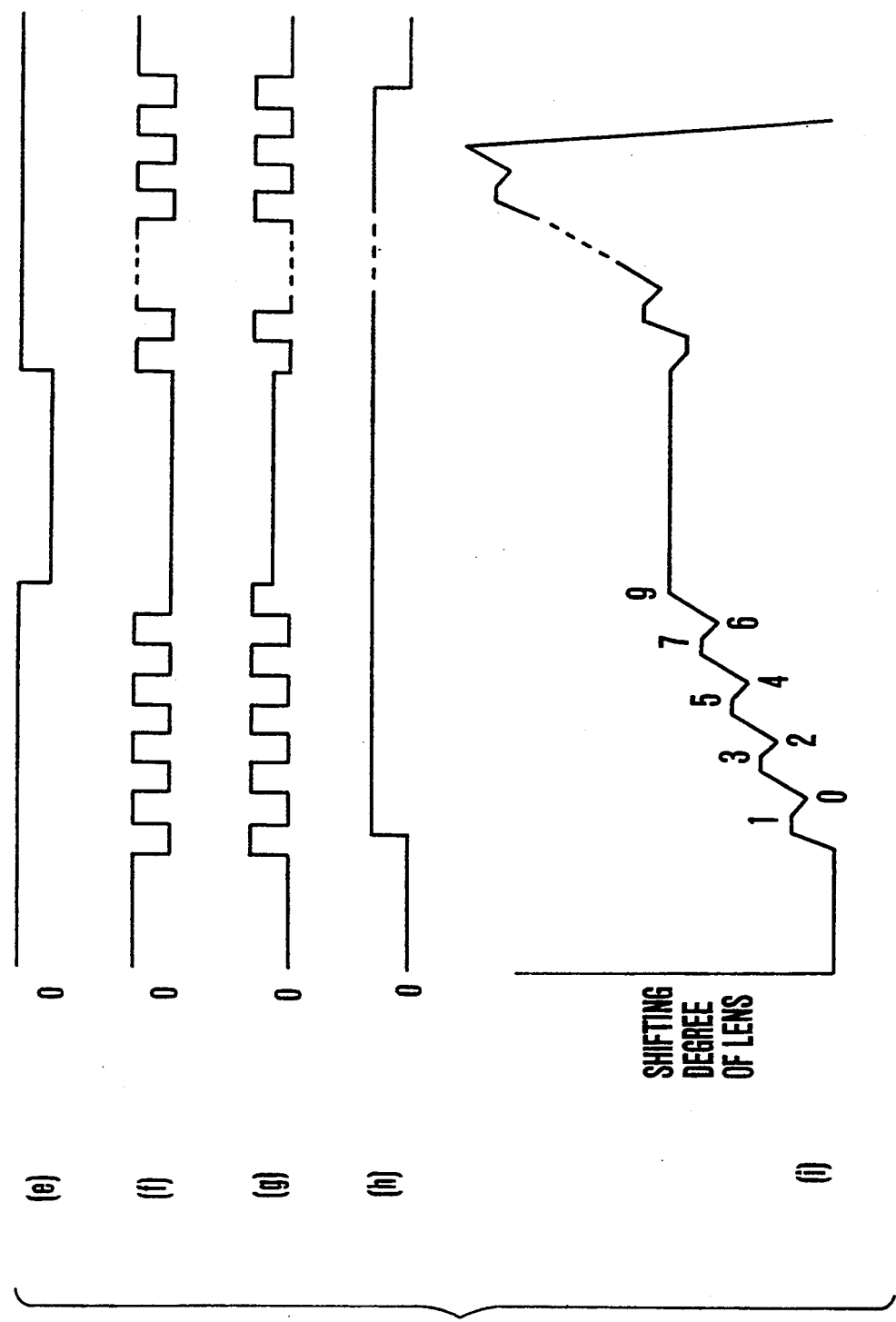
FIG. 7 shows the timing of an output signal supplied from the control circuit to the driving circuit when the measured distance data N is an odd number together with a lens shifting degree.

When the measured distance data N is an odd number, the operation of the driving circuit III is performed and the lens barrel 41 is shifted in a manner as described below with reference to FIG. 7:

FIG. 7 is a timing chart showing the operation of the driving circuit III performed in cases where the above-stated data N is an odd number. In this case, the data N is assumed to be 9. While the lens is arranged to be shifted (N+1)/2 cycle times, i.e., five cycle times, the level of the signal line e becomes low and the current supply is set at the hold current before the current supply to the magnet 3 for the fifth cyclic round is cut off. Since the signal line f is then at a low level and the transistor 13 is in a nonconductive state, the current supply to the magnet 3 is kept on. Therefore, as shown at the part (i) in FIG. 7, the lens is brought to a stop at a point indicated by a reference numeral 9. The rest of the operation is performed in the same manner as in the case of FIG. 6.

The hold current supply is allowed to continue for a give period of time. After this, the shutter is opened and closed by turning on and off the current supply to the coil 34 of the magnet MB. After that, the current supply to the coil 34 of the other magnet MA is cut off.

In the event that the measured distance data N is an odd number, the moving yoke 32 of the magnet MA comes into tight contact with the fixed yoke 31; the teeth 40c of the cam ring 40 is moved by the feed pawl 38; and a photograph taking shot is taken when the cam ring 40 is completely moved to the right as viewed in the drawing. The phase of the cam ring 40 and that of the driving lever 36 are adjusted by means of the eccentric pin 37 in such a manner that, in this instance, the cam ring 40 comes to a stop exactly at a midpoint between points at which the ring 40 is brought to a stop by the lock pawl 46 for every tooth.

Therefore, in this instance, the photo-taking lens is drawn out to a middle position between or notches corresponding to the teeth at which the cam ring 40 is brought to a stop by the lock pawl 46 in a case where the measured distance data N is an even number.

As described above, two different photographing states are obtainable including one in which the current supply to the coil 34 of the magnet MA is cut off and the other in which the current supply is kept on. By virtue of this operation, the number of stopping positions of the cam ring 40, i.e., the number of lens shifting positions, can be arranged to be approximately twice as many as the number of the teeth provided on the cam ring 40. Therefore, the lens can be drawn out to the extent of a given number of notches or graduations by cyclically effecting the current supply a number of times which is only about one-half the number of times otherwise necessary.

At the steps #121 to #123: In both the cases where the measured distance data N is an even number and where the data N is an odd number, the current supply to the coil 34 of the magnet MA is repeated. This causes the cam ring 40 to rotate further. When the cam ring 40 makes exactly one rotation from its start position, a lens reset switch which is not shown is closed. As a result, the current supply is cut off and the lens is brought back to its initial position. At the step #124: The film is wound up. The flow comes back to the step #102 to wait for a next photographing operation.

As mentioned above, in accordance with the arrangement of this embodiment, the lens shifting positions can be set at about two times as many points as the number of the teeth of the cam member (ring).

Since the lens can be shifted to the extent of a given number of graduations by cyclically effecting the power supply only a number of times which is about one-half the number of times otherwise required. The length of time required in shifting the lens, therefore, can be shortened. This shortens a time lag necessary before the shutter comes to open after the shutter release button is pushed.

Further, since the number of the lens shifting positions that can be set is about two times as many as the number of teeth of the cam member, the cam member can be arranged in a smaller size than a cam member which is arranged to have the same number of teeth as the number of lens shifting positions. This effectively contributes to a reduction in size of the camera.

Figure 11:
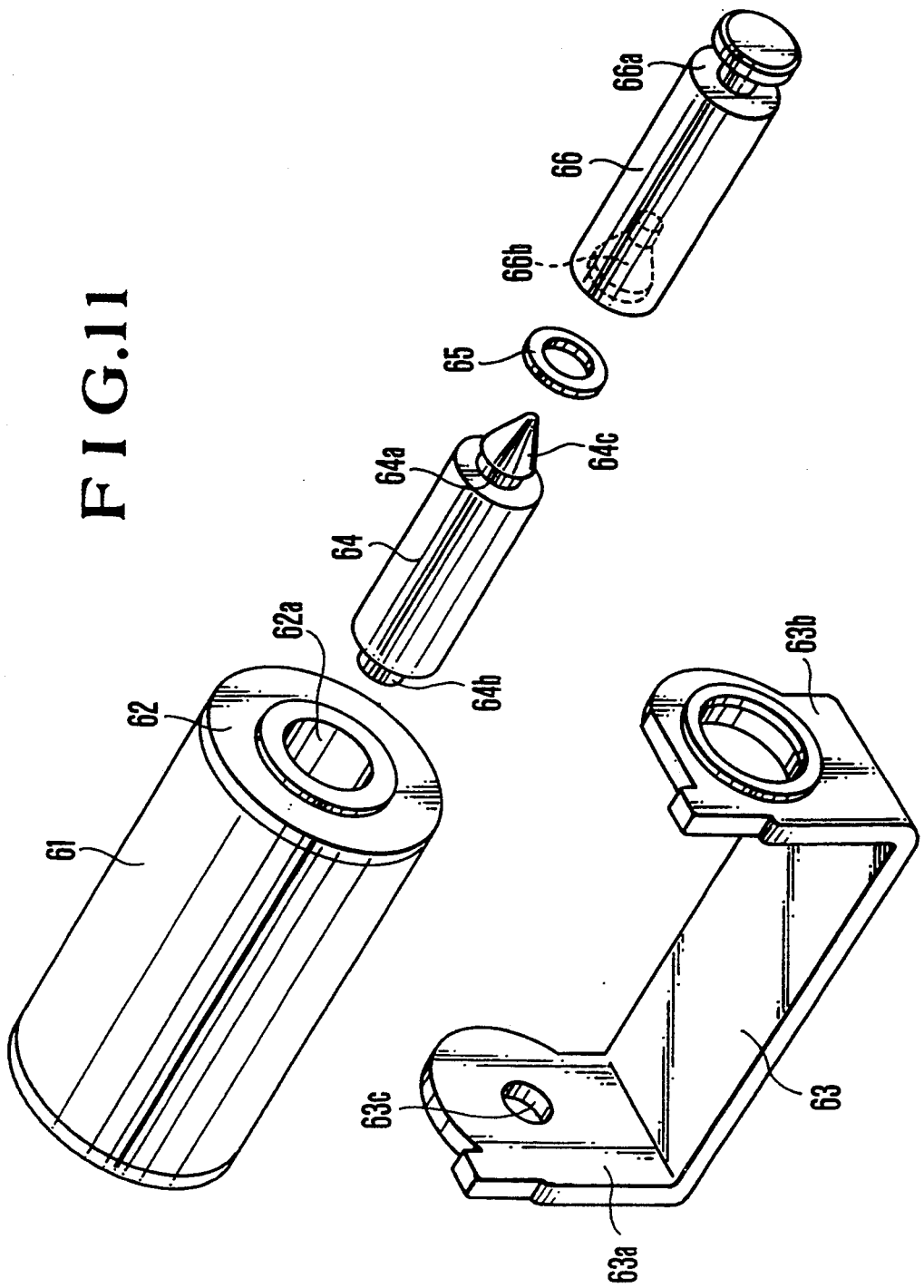
FIG. 11 is a oblique view showing a plunger type magnet arranged as another embodiment of the invention.

FIG. 11 shows in an oblique view a plunger type magnet MA or MB which is disposed as shown in FIG. 8 but is arranged as another embodiment of this invention. Referring to FIG. 11, a cylindrical bobbin 62 is provided with a circular hole 62a. Around the outer circumferential side of the bobbin 62 is wound a coil 61 which is arranged to be energized and controlled by an electrical circuit (not shown). A C-shaped holder 63 is arranged to form a magnetic circuit. The bobbin 62 is secured to and carried between the rear end bent part 63a and the fore end bent part 63b of the holder 63. A fixed yoke 64 is fitted into the rear part of the circular hole 62a of the bobbin 62. The fixed yoke 64 has a rear end projection 64b which is fitted into a small hole 63c provided in the rear bent part 63a of the holder 63. A moving yoke 66 is arranged to be inserted into the front part of the circular hole 62a. The fore end part of the yoke 66 is provided with a small diameter part 66a which protrudes forward from the front end face of the bobbin 62. When a current is supplied to the coil 61, the moving yoke 66 moves toward the fixed yoke 64.

A conical projection 64c is formed on the fore end part of the fixed yoke 64. A circular groove 64a is formed at the base part of the conical projection 64c. In the rear end part of the moving yoke 66 is formed a conical hole 66b which is arranged to be opposed at a given spacing distance to the conical projection 64c of the fixed yoke 64 when the moving yoke 66 is pulled as a result of the current supply.

An elastic member 65 is formed with a silicone rubber or the like in an annular shape and is fitted in the circumferential groove 64a of the fixed yoke 64. The rear end face of the moving yoke 66 impinges on the elastic member 65 when the moving yoke 66 is pulled.

In the case of the plunger type magnet of this embodiment, when the moving yoke 66 is pulled with the current supplied to the coil 61, the elastic member 65 interposed in between the fixed yoke 64 and the moving yoke 66 prevents collision between metal members by absorbing the impact. This reduces noise and particularly a disagreeable metallic sound. Further, the elastic member eliminates such a problem that is caused by peeling off a metal powder or the like, so that the durability of the magnet can be increased. Further, since the elastic member 65 is the sole part between the fixed yoke 64 and the moving yoke 66, the dimensional tolerance for the gap of the magnetic circuit depends only on the precision of the thickness of the elastic member 65. Therefore, the gap dimension is stabilized to stabilize the pulling and holding forces. In cases where the metal members come into contact directly with each other without any elastic member between them, it takes a long period of time in separating the moving yoke when the current supply is cut off, although such arrangement gives a strong attracting or pulling force when the current is supplied to the coil. Besides, the length of time required varies. Whereas, in accordance with the arrangement of this embodiment, the length of time required in separating the moving yoke can be shortened and stabilized, although the pulling force becomes somewhat smaller in pulling the moving yoke into contact with the fixed yoke.

Further, the elastic member 65 can be fitted on the circumferential groove 64a of the fixed yoke 64 by temporarily enlarging its inner diameter. It thus can be securely set in position without recourse to any adhesive or the like. This facilitates assembly work without the possibility of having an adhesive spreading out of place, so that the reliability of the magnet can be enhanced.

FIG. 12 shows in a sectional view a plunger type magnet MA or MB which is disposed as shown in FIG. 8 but is arranged as a further embodiment of this invention. In the above-stated embodiment, the conical projection 64c is provided at the fore end part of the fixed yoke 64 while the conical hole 66b which is opposed to the conical projection 64c is formed in the rear end part of the moving yoke 66. Whereas, in the case of this embodiment, a conical projection 76b is formed at the lower end part of a moving yoke 76 instead of on the fixed yoke. A circumferential groove 76a is formed in the base part of the moving yoke 76. The elastic member 65 is fitted in the circumferential groove 76a. A conical hole 74a which corresponds to this conical projection 76b is formed in the fore end part of a fixed yoke 74.

In this case, the elastic member 65 is disposed on the moving yoke 76. Therefore, attention must be paid to the outside diametral dimension, etc. of the elastic member to ensure that the action of the moving yoke 76 is not affected by the sliding movement between the inner surface of the circular hole 62a of the bobbin 62 and the elastic member 65. With the exception of this, the embodiment is arranged in the same manner as the arrangement shown in FIG. 11. Therefore, the same reference numerals as those used in FIG. 11 are used for the same parts and the details of these parts are omitted from description.

FIG. 13 shows in a sectional view a plunger type magnet MA or MB which is disposed as shown in FIG. 8 and is arranged as a further embodiment of the invention. In the case of FIG. 13, a conical projection 86b is also formed at the lower end part of a moving yoke 86 as in the case of FIG. 12. A conical hole 84a is formed in the fore end part of the fixed yoke 84. Further, in this case, a hole part 84b is also formed coaxially with and continuously from the conical hole 84a in the fixed yoke 84. A cylindrical elastic member 85 is attached to this hole part 84b. The elastic member 85 extends longer than the depth of the hole part 84b. When the moving yoke 86 is pulled, its conical projection 86b comes to abut on the elastic member 85 to compress and deform the latter. This forms a predetermined slight gap between the moving yoke 86 and the fixed yoke 84. The elastic member 85 is secured to the hole part 84b either by arranging the outer diameter of the former a little larger than the inside diameter of the latter and by inserting the former into the latter with pressure or by using an adhesive or the like.

With the exception of this, the magnet of FIG. 13 is arranged in the same manner as in the case of FIG. 11. Therefore, in FIG. 13, the same parts are indicated by the same reference numerals and the details of them are omitted from description.

Further, in each of the embodiments described, the elastic member is provided only on one of the yokes. However, this arrangement may be changed to provide elastic members on both the yokes.

As described in the foregoing, in the case of each of the further embodiments, the impact of collision which takes place between the yokes when a current is supplied to the coil is eased by the elastic member. This reduces noise and provides for a highly durable magnet.

The elastic member is arranged to be interposed in between the two yokes when a current is supplied to the coil. Therefore, a gap between the yokes can be kept unvarying to stabilize the pulling (or attracting) and holding forces. This also shortens a length of time required in separating the moving yoke. Besides, the length of time required for that purpose does not much vary. Therefore, the invented arrangement gives an electromagnet of a stable cut-off characteristic.

The smaller diameter part formed, for example, at the fore end part of the fixed yoke enables the elastic member to be mounted by a simple structural arrangement.

In each of the embodiments described, this invention is applied to a lens drawing-out mechanism. However, it goes without saying that the invention is likewise applicable to a lens drawing-in mechanism.

Further, in each of the embodiments described, a photo-taking lens is arranged to be drawn out or in. However, the invention is, of course, likewise applicable to an optical systems of other kinds.

What is claimed is:

1. An optical system driving device for a camera, comprising:
    a) displacement means for actuating a phototaking optical system by displacement;
    b) driving means, arranged to alternately assume either a first state or a second state, for shifting said displacement means to a first given degree in a predetermined direction when the first state changes to the second state, and for shifting said displacement means in a direction reverse to the predetermined direction to a second given degree which is smaller than the first given degree when the second state changes to the first state;
    c) first stopping means for stopping said driving means in the first state;
    d) second stopping means for stopping said driving means in the second state; and
    e) photographing means for performing photography under a condition that said driving means is selectively stopped by either said first stopping means in the first state or said second stopping means in the second state.

2. A device according to claim 1, wherein said driving means comprises means for rendering the second given degree to be substantially half of the first given degree.

3. A device according to claim 1, wherein said first stopping means comprises means for holding said driving means in the first state.

4. A device according to claim 3, wherein said second stopping means comprises means for holding said driving means in the second state.

5. A device according to claim 1, wherein said second stopping means comprises means for holding said driving means in the second state.

6. A device according to claim 1, wherein said driving means comprises moving means for assuming the first state and the second state.

7. A device according to claim 6, further comprising adjustment means for adjusting a moving state of said moving means.

8. A device according to claim 6, further comprising buffer means, located at a position to contact said moving means, for absorbing an impact of a collision of said moving mean when said moving means is stopped.

9. A device according to claim 8, wherein said buffer means comprises means for damping sound.

10. A device according to claim 8, wherein said buffer means comprises an elastic member.

11. A device according to claim 10, wherein said driving means comprises a necked portion into which said elastic member is inserted.

12. An optical system driving device for a camera, comprising:
    a) displacement means for actuating a phototaking optical system by displacement;
    b) driving means, arranged to alternately assume either a first state or a second state, for shifting said displacement means to a first given degree in a predetermined direction when the first state changes to the second state, and for shifting said displacement means in a direction reverse to the predetermined direction to a second given degree which is smaller than the first given degree when the second state changes to the first state;
    c) first holding means for holding said driving means in the first state;
    d) second holding means for holding said driving means in the second state; and
    e) photographing means for performing photography under a condition that said driving means is selectively held by either said first holding means in the first state or said second holding means in the second state.

13. A device according to claim 12, wherein said driving means comprises means for rendering the second given degree to be substantially half of the first given degree.

14. A device according to claim 12, wherein said driving means comprises moving means for assuming the first state and the second state.

15. A device according to claim 14, further comprising adjustment means for adjusting a moving state of said moving means.

16. A device according to claim 14, further comprising buffer means, located at a position to contact said moving means, for absorbing an impact of a collision of said moving means when said moving means is stopped.

17. A device according to claim 16, wherein said buffer means comprises means for damping sound.

18. A device according to claim 16, wherein said buffer means comprises an elastic member.

19. A device according to claim 18, wherein said driving means comprises a necked portion into which said elastic member is inserted.

20. A camera, comprising:
a) displacement means for actuating a phototaking optical system by displacement;
b) driving means, arranged to alternately assume either a first state or a second state, for shifting said displacement means to a first given degree in a predetermined direction when the first state changes to the second state, and for shifting said displacement means in a direction reverse to the predetermined direction to a second given degree which is smaller than the first given degree when the second state changes to the first state;
c) first stopping means for stopping said driving means in the first state;
d) second stopping means for stopping said driving means in the second state; and
e) photographing means for performing photography under a condition that said driving means is selectively stopped by either said first stopping means in the first state or said second stopping means in the second state.

21. A camera according to claim 20, wherein said driving means comprises means for rendering the second given degree to be substantially half of the first given degree.

22. A camera according to claim 20, wherein said first stopping means comprises means for holding said driving means in the first state.

23. A camera according to claim 22, wherein said second stopping means comprises means for holding said driving means in the second state.

24. A camera according to claim 20, wherein said second stopping means comprises means for holding said driving means in the second state.

25. A camera according to claim 20, wherein said driving means comprises moving means for assuming the first state and the second state.

26. A camera according to claim 25, further comprising adjustment means for adjusting a moving state of said moving means.

27. A camera according to claim 26, further comprising buffer means, located at a position to contact the moving means, for absorbing an impact of a collision of said moving means when said moving means is stopped.

28. A camera according to claim 27, wherein said buffer means comprises means for damping sound.

29. A camera according to claim 28, wherein said buffer means comprises an elastic member.

30. A camera according to claim 29, wherein said driving means comprises a necked portion into which said elastic member is inserted.

31. A camera comprising:
a) displacement means for actuating an optical system by displacement;
b) driving means, arranged to alternately assume either a first state or a second state, for shifting said displacement means to a first given degree in a predetermined direction when the first state changes to the second state, and for shifting said displacement means in a direction reverse to the predetermined direction to a second given degree which is smaller than the first given degree when the second state changes to the first state;
c) first holding means for holding said driving means in the first state;
d) second holding means for holding said driving means in the second state; and
e) camera action means for performing a camera-action under a condition that said driving means is selectively held by either said first holding means in the first state or said second holding means in the second state.

32. A camera according to claim 31, wherein said driving means comprises means for rendering the second given degree to be substantially half of the first given degree.

33. A camera according to claim 31, wherein said driving means comprises moving means for assuming the first state and the second state.

34. A camera according to claim 33, further comprising adjustment means for adjusting a moving state of said moving means.

35. A camera according to claim 33, further comprising buffer means, located at a position to contact said moving means, for absorbing an impact of a collision of said moving means when said moving means is stopped.

36. A camera according to claim 35, wherein said buffer means comprises means for damping sound.

37. A camera according to claim 35, wherein said buffer means comprises an elastic member.

38. A camera according to claim 37, wherein said driving means comprises a necked portion into which said elastic member is inserted.

39. An optical system driving device, comprising:
a) displacement means for actuating an optical system by displacement;
b) driving means, arranged to alternately assume either a first state or a second state, for shifting said displacement means to a first given degree in a predetermined direction when the first state changes to the second state, and for shifting said displacement means in a direction reverse to the predetermined direction to a second given degree which is smaller than the first given degree when the second state changes to the first state;
c) first holding means for holding said driving means in the first state;
d) second holding means for holding said driving means in the second state; and
e) camera action means for performing a camera-action under a condition that said driving means is selectively held by either said first holding means in the first state or said second holding means in the second state.

40. A device according to claim 39, wherein said driving means comprises means for rendering the second given degree to be substantially half of the first given degree.

41. A device according to claim 39, wherein said driving means comprises moving means for assuming the first state and the second state.

42. A device according to claim 41, further comprising adjustment means for adjusting a moving state of said moving means.

43. A device according to claim 41, further comprising buffer means, located at a position to contact said moving means, for absorbing an impact of a collision of said moving means when said moving means is stopped.

44. A device according to claim 43, wherein said buffer means comprises means for damping sound.

45. A device according to claim 43, wherein said buffer means comprises an elastic member.

46. A device according to claim 45, wherein said driving means comprises a necked portion into which said elastic member is inserted.

* * * * *

UNITED STATES PATENT AND TRADEMARK OFFICE
CERTIFICATE OF CORRECTION

PATENT NO. : 5,144,353

DATED : September 1, 1992

INVENTOR(S) : Yukio ODAKA, et al.

It is certified that error appears in the above-identified patent and that said Letters Patent is hereby corrected as shown below:

ON THE TITLE PAGE,
AT [57] ABSTRACT:

line 9, "a" should be deleted; and
    line 10, "first" should read --a first--.

COLUMN 9:

line 26, "this, opera-" should read --this opera---; and
    line 62, "sixth" should read --one-sixth--.

COLUMN 12:

line 41, "taking shot" should be deleted.

COLUMN 16:

line 23, "mean" should read --means--.

COLUMN 17:

line 55, "camera" should read --camera,--.

Signed and Sealed this

Twelfth Day of October, 1993

Attest:

BRUCE LEHMAN

Attesting Officer     Commissioner of Patents and Trademarks